United States Patent
Sarin

(10) Patent No.: US 10,616,799 B2
(45) Date of Patent: *Apr. 7, 2020

(54) CACHING AND PROVIDING DATA TO A DEVICE BASED ON AVAILABLE RESOURCES

(71) Applicant: PAYPAL, INC., San Jose, CA (US)

(72) Inventor: Pankaj Sarin, Elkhorn, NE (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,623

(22) Filed: Mar. 18, 2019

(65) Prior Publication Data
US 2019/0215722 A1 Jul. 11, 2019

Related U.S. Application Data

(63) Continuation of application No. 15/698,058, filed on Sep. 7, 2017, now Pat. No. 10,237,783.

(51) Int. Cl.
| H04W 72/00 | (2009.01) |
| H04W 28/06 | (2009.01) |
| H04W 24/04 | (2009.01) |
| H04W 4/18  | (2009.01) |
| H04W 4/00  | (2018.01) |

(52) U.S. Cl.
CPC ........... *H04W 28/06* (2013.01); *H04W 4/00* (2013.01); *H04W 4/18* (2013.01); *H04W 24/04* (2013.01)

(58) Field of Classification Search
CPC ......... H04W 28/06; H04W 4/00; H04W 4/18; H04W 24/04
USPC ........................ 455/343.1, 452.1, 452.2, 453
See application file for complete search history.

(56) References Cited

U.S. PATENT DOCUMENTS

| 6,975,868 B2 * | 12/2005 | Joshi ..................... H04W 28/22 370/335 |
| 9,319,954 B2 | 4/2016 | Zhuang et al. |
| 9,851,965 B2 * | 12/2017 | Holostov .................. G06F 8/70 |
| 2003/0026291 A1 * | 2/2003 | Engel .................. H04L 41/0896 370/468 |
| 2008/0239976 A1 | 10/2008 | Altman |
| 2009/0089418 A1 * | 4/2009 | Saha ................... H04L 43/0876 709/224 |
| 2017/0311291 A1 | 10/2017 | Dai et al. |

* cited by examiner

*Primary Examiner* — Sonny Trinh
(74) *Attorney, Agent, or Firm* — Haynes and Boone LLP

(57) ABSTRACT

In response to detecting, at the first time period, that the available amount of the first resource on the computing device is below the first threshold level, the computer system switches the computing device to a first low resource mode, wherein the switching the computing device to the first low resource mode includes intercepting a first data intended to be transmitted to the computing device, the first data corresponding to a first set of one or more applications on the computing device. In response to detecting, at a second time period that is after the first time period, that the available amount of the first resource on the computing device meets or exceeds the first threshold level, the computer system switches the computing device back to a normal operating mode.

20 Claims, 5 Drawing Sheets

CACHING AND PROVIDING DATA TO A DEVICE BASED ON AVAILABLE RESOURCES

CROSS-REFERENCE TO RELATED APPLICATIONS

This application is a continuation of U.S. patent application Ser. No. 15/698,058, filed Sep. 7, 2017, which is herein incorporated by reference in its entirety.

TECHNICAL FIELD

The present disclosure relates generally to detection of available resources on a device, and more particularly to caching data and providing data to a device based on the available resources detected on the device.

BACKGROUND

In today's age, users have an ever-increasing number of applications on their computing devices and mobile devices. Along with taking up storage space, some applications may take up a significant amount of computing resources, and in some cases, may drain the battery power of the device when loading and executing. Furthermore, with the number of apps running in the background, receiving updates and information from various sources, a computing device or mobile device of a user can lose significant charge without the user even realizing it. A low amount of charge can lead to a user not having a mobile device or computing device when he or she needs it the most.

DETAILED DESCRIPTION

Embodiments of the present disclosure provide a system, method, and program product. A computer system detects, at a first time period, whether an available amount of a first resource on a computing device is below a first threshold level. In response to detecting, at the first time period, that the available amount of the first resource on the computing device is below the first threshold level, the computer system switches the computing device to a first low resource mode, wherein the switching the computing device to the first low resource mode includes intercepting a first data intended to be transmitted to the computing device, the first data corresponding to a first set of one or more applications on the computing device. In response to detecting, at a second time period that is after the first time period, that the available amount of the first resource on the computing device meets or exceeds the first threshold level, the computer system switches the computing device back to a normal operating mode, wherein the switching the computing device back to the normal operating mode includes halting the intercepting of the first data intended to be transmitted to the computing device.

In the example embodiment, the present disclosure describes a solution to the problem of maximizing usage time and usage abilities when a computing device or mobile device has a low amount of available resources. For example, if a computing device has a low level of battery life left, the present disclosure provides a solution where data corresponding to one or more applications are intercepted and stored on an alternate storage device, and then, at a later time, transmitted to the computing device based on detecting that the computing device has been charged to a certain level. In this example, the present disclosure provides a solution that solves the problem of a computing device using available battery power to receive, store and present received data to a user of the computing device, which may lead to the battery being drained further and the computing device or mobile device being available to the user for a shorter period of time (and potentially not available to the user in case of emergency).

Furthermore, in the example embodiment, the present disclosure describes a solution that involves detected that an available amount of resources on the computing device are below a threshold level, such as storage/memory or computing power, in which case, as stated above, data corresponding to one or more applications may be intercepted and then transmitted to the computing device, at a later time, once the computing device has reached a requisite amount of resources (such as storage capacity, etc.).

Embodiments of the present disclosure will now be described in detail with reference to the accompanying Figures.

Figure 1:
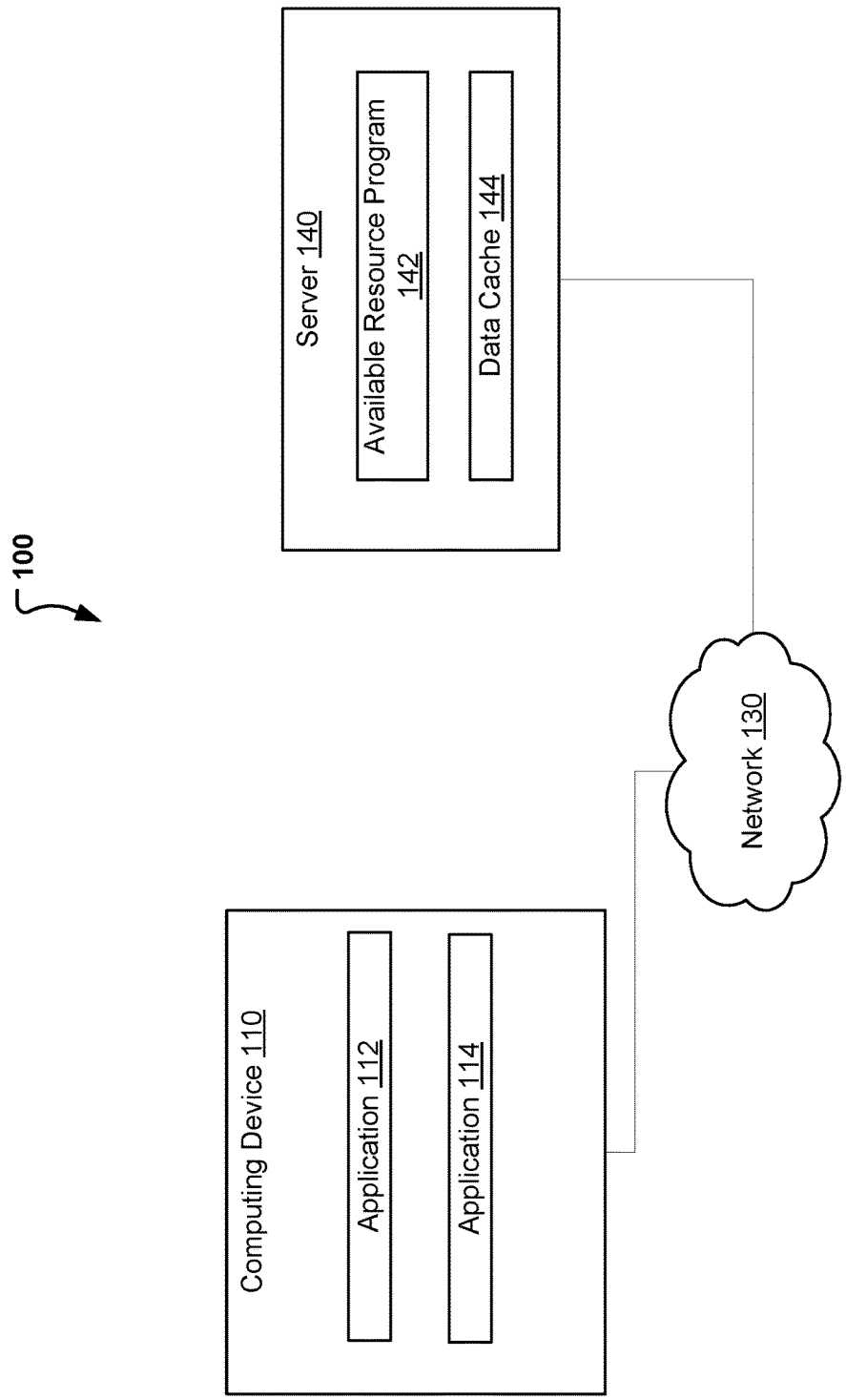
FIG. 1 illustrates an available resource system, in accordance with an embodiment.

FIG. 1 illustrates available resource system 100, in accordance with an embodiment. In the example embodiment, available resource system 100 includes computing device 110 and server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110 and server 140.

Computing device 110 includes application 112 and application 114. In the example embodiment, computing device 120 is a computing device such as a smartphone, however in other embodiments, computing device 120 may be a desktop computer, a laptop computer, a tablet computer, a handheld device, a thin client, or any other electronic device or computing system capable of receiving and sending data to and from other computing devices, such as server 140, via network 130. Computing device 120 is described in more detail with reference to FIG. 5.

Application 112 is an application or program, such as a financial application, a social media application, a web browser, or another type of application. Application 112 is described in more detail with reference to FIGS. 2 and 3.

Application 114 is an application or program, such as a financial application, a social media application, a web browser, or another type of application. Application 114 is described in more detail with reference to FIGS. 2 and 3.

Server 140 includes available resource program 142 and data cache 144. In the example embodiment, server 140 may be a desktop computer, a laptop computer, a tablet computer, a mobile device, a handheld device, a thin client, or any other electronic device or computing system capable of receiving and sending data to and from other computing devices, such as computing device 110, via network 130. Although not shown, optionally, server 140 can comprise a cluster of servers executing the same software to collectively process requests as distributed by a front end server and a load balancer. In the example embodiment, server 140 is a server that supports available resource program 142. Server 140 is described in more detail with reference to FIG. 5.

Data cache 144 includes electronic content/data corresponding to application 112 and application 114. In the example embodiment, the data contained in data cache 144 is data, intended for computing device 110, that has been intercepted by (or redirected to) available resource program 142 based on a detection by available resource program 142 that computing device 110 has low available resources. While in the example embodiment, only computing device 110 (and application 112 and application 114) are depicted, data cache 144 may be a plurality of cache memory that may contain information for a plurality of applications across a plurality of computing devices. Data cache 144 is described in more detail with reference to FIGS. 2 and 3.

In the example embodiment, available resource program 142 is a program capable of detecting whether a computing device, such as computing device 110, is low on available resources (such as battery life or storage space/memory). Furthermore, based on detecting that computing device 110 is low on available resources, available resource program 142 is capable of intercepting data intended for computing device 110, and based on later detecting that the amount of resources on computing device 110 meets or exceeds a threshold level, releasing or transmitting the data to computing device 110. The operations of available resource program 142 are described in further detail with regard to FIGS. 2 and 3.

Figure 2:
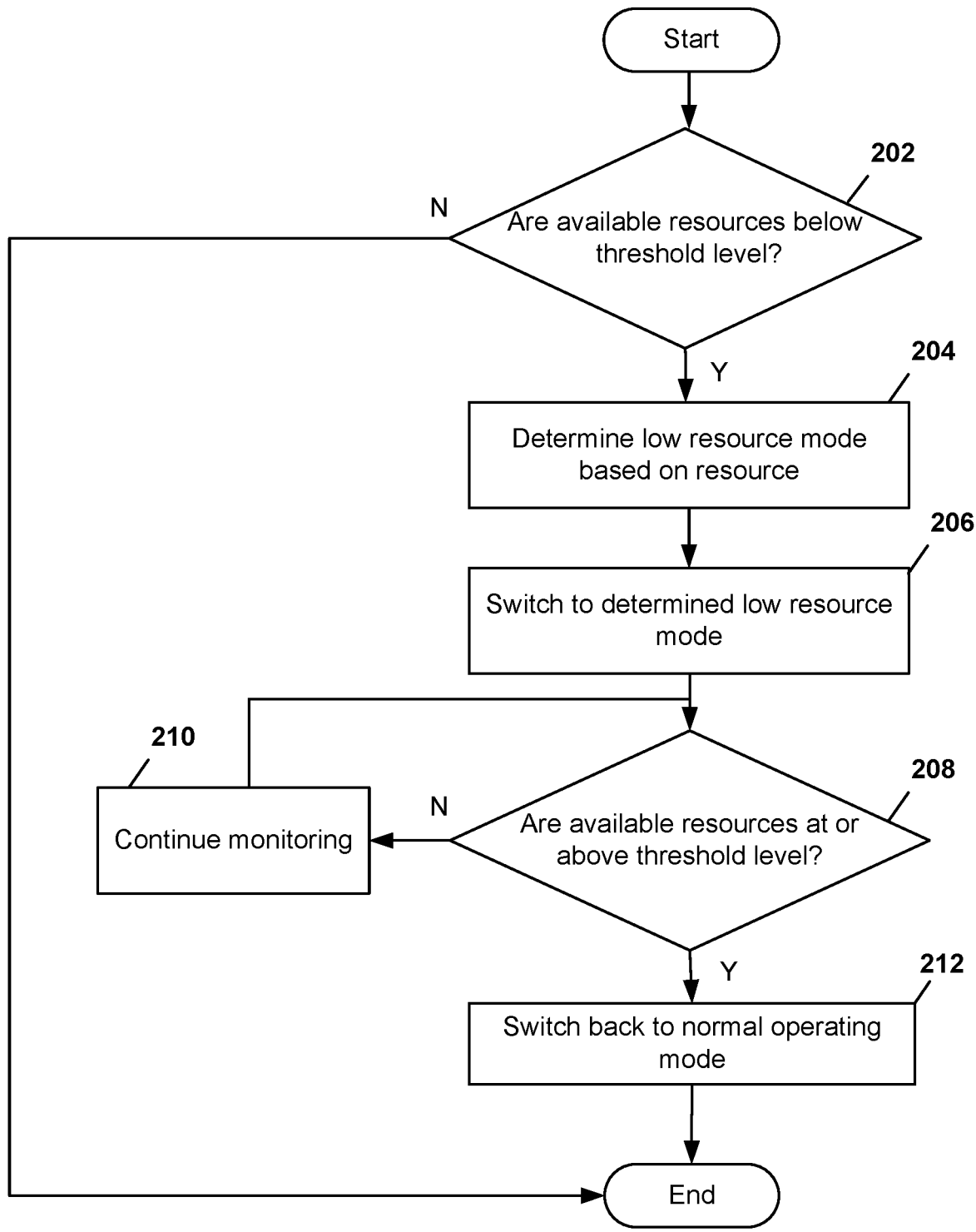
FIG. 2 is a flowchart illustrating the operations of the available resource program of FIG. 1 in detecting an available amount of resources for a computing device, and based on the detected available amount of resources, determining whether to switch the computing device into a low resources mode, in accordance with an embodiment.

FIG. 2 is a flowchart illustrating the operations of available resource program 142 in detecting an available amount of resources for a computing device, and based on the detected available amount of resources, determining whether to switch the computing device into a low resources mode, in accordance with an embodiment.

In the example embodiment, available resource program 142 determines, via network 130, whether, at a first time period, an amount of an available resource on computing device 110 is below a threshold level (decision 202). In the example embodiment, available resource program 142 may communicate or monitor the usage of computing device 110 and determine whether an amount of an available resource from a plurality of available resources is below a threshold level. For example, available resource program 142 may monitor resources such as available storage, available random access memory (RAM), available processing capabilities, available battery life, and further available components (detect whether speakers are functioning properly, etc.). In the example embodiment, each resource of computing device 110 may have a different threshold level, and therefore, available resource program 142 may do a comparison of the level of each available resource against the respective threshold level.

In the example embodiment, the threshold level (or levels) may be input by a system administrator, or alternatively input by the user of computing device 110. In other embodiments, the threshold level (or levels) may be determined based on an analysis of the specification of the components of computing device 110. For example, available resource program 142 may determine a lower threshold level (for the available resource of computing power) for computing device 110 in comparison to computing device A based on determining that computing device 110 has a higher computing power than computing device A. In another example, available resource program 142 may determine a lower threshold level (for the available resource of battery life) for computing device 110 in comparison to computing device A based on determining that computing device 110 has a larger cell battery than computing device A (i.e. —10% charge on computing device 110 may support computing life for 30 min, while 10% charge on computing device A may support computing life for only 20 min).

In further embodiments, available resource program 142 may additionally utilize machine-learning techniques to determine a threshold level for an available resource. For example, available resource program 142 may monitor usage of computing device 110 and determine that based on the historical level of usage of computing device 110, a 10% battery charge may last 1 hour, versus only 30 min for computing device A (which may also be determined based on analysis of the usage of computing device A). Furthermore, available resource program 142 may determine a dynamic threshold level that may change based on the day of the week, time of year, or time of day. For example, based on monitoring the usage of computing device 110 over a period of time, available resource program 142 may determine that during a first time period, a 10% charge typically lasts as long as a 12% charge does during a second time period. Therefore, during the first time period the threshold level for the available resource battery life may be 10%, while it may be 12% during the second time period. In addition, to historical usage, when determining the dynamic threshold level for computing device 110, the number of applications present on computing device 110 may also be taken into account, as well as the number of active applications currently running, and applications running in the background.

If available resource program 142 determines that the amount of the available resource on computing device 110 is not below the respective threshold level (decision 202, "NO" branch), available resource program 142 continues to monitor computing device 110 to determine if the threshold level is breached.

If available resource program 142 determines that the amount of the available resource on computing device 110 is below the respective threshold level (decision 202, "YES" branch), available resource program 142 determines a low resource mode that corresponds to the resource (step 204). In the example embodiment, as stated above each available resource being monitored by available resource program 142 may have a respective threshold level. Furthermore, available resource program 142 may determine a specific low resource mode based on the respective resource. In the example embodiment, the threshold level and the specific low resource mode may be stored in association with the resource so that available resource program 142 may reference the information. Therefore, in the example embodiment, available resource program 142 may reference the stored information in order to determine a specific low resource mode that corresponds to a resource whose available level has been detected below the respective threshold level. For example, if available resource program 142 detects that an amount of available storage on computing device 110 is below the respective threshold level, available resource program 142 may reference the stored information associated with the resource in order to identify the low resource mode that corresponds to the resource (storage on device). In further embodiments, multiple low resource modes may correspond to a resource. For example, if the available battery life on computing device 110 is detected at 10%, with the threshold being 12%, available resource program 142 determines that the available amount of resources is below the threshold level and determines a low resource mode that corresponds to the resource. However, if the available battery life is detected at 8%, a second low resource mode may be determined to correspond to the resource (and the available amount of the resource).

While in the example embodiment, each resource may correspond to a different specific low resource mode, in other embodiments, some or all resources may correspond to the same specific low resource mode.

Available resource program 142 switches computing device 110 into the determined low resource mode (step 206). In the example embodiment, available resource program 142 may switch computing device 110 into determined low resource mode without performing an action on computing device 110, but rather by toggling an indicator maintained in a database, the indicator corresponding to computing device 110. In other embodiments, available resource program 142 may transmit a notification to computing device 110 that low resource mode is being toggled.

In the example embodiment, low resource mode includes available resource program 142 identifying one or more applications, and then intercepting data intended to be transmitted from the respective application servers to computing device 110. For example, available resource program 142 may identify one or more applications, by way of identifying applications on computing device 110 that utilize a large percentage of computing power or memory, identifying applications based on an application priority input by the user of computing device 110, identifying an application or applications that correspond to the determined low resource mode as specified in user input, identifying applications based on the applications being used infrequently by the user of computing device 110, or a mixture of the above. In the example embodiment, available resource program 142 may additionally receive or fetch user information for one or more applications on computing device 110, such as application 112 and application 114, from computing device 110. For example, the user information may include login information, application usage information, an application transaction history, and any other user information associated with the relevant application or applications.

Available resource program 142 may then utilize the user information to check-in with the respective applications servers periodically to determine if there are any updates or messages (poll for updates or messages) that are to be transmitted to computing device 110. In the example embodiment, available resource program 142 may check-in with an application server every 10 seconds, while in other embodiments, the check-ins may be performed more or less frequently. Furthermore, the frequency of the check-ins may additionally correspond to the type of application or the frequency at which the user of computing device 110 utilizes the application (the more frequent the application has been utilized by the user historically, the more frequent the check-ins are performed). If available resource program 142 determines that there is data (such as an update or message) that is to be transmitted to computing device 110, available resource program 142 intercepts the data and caches the data in data cache 144 (or stores the data in a storage database in association with an identifier corresponding to computing device 110, the application, and the specific data. In other embodiments, the intercepted data may only be stored in association with an identifier corresponding to the specific data, or an identifier corresponding to the specific data and the computing device 110. Additionally, prior to caching the data, available resource program 142 may classify the data based on the size of the data, the device capabilities required to view the data (high resolution video needs certain device capabilities, etc.). Furthermore, in additional embodiments, available resource program 142 may transmit references to the cached data, such as the identifier, to computing device 110.

As stated above, a first low resource mode may correspond to a first amount of available resource, while a second low resource mode may correspond to a second amount of available resource. In an example, the first low resource mode may include available resource program 142 intercepting data intended to be transmitted to computing device 110 from a first application server (corresponding to application 112), but not a second application server (corresponding to application 114), while the second low resource mode may include available resource program 142 intercepting data intended to be transmitted to computing device 110 from the first application server (corresponding to application 112) and the second application server (corresponding to application 114). Therefore, referring to the example, if available resource program 142 determines that based on the amount of available resource, such as battery life, that a first low resource mode is applicable, available resource program 142 will intercept data to be transmitted to computing device 110 from the first application server, in the manner described above. If at a later time, available resource program 142 determines that based on the amount of available resource that the second low resource mode is applicable, available resource program 142 will intercept data to be transmitted to computing device 110 from the first application server and the second application server.

In an example, if available resource program 142 determines that levels/amounts of multiple available resources are below their respective threshold levels, available resource program 142 may determine which low resource mode to switch to based on determining which low resource mode has a higher caution factor. In the example embodiment, a caution factor may be associated with each low resource mode based on the level of caution exemplified by the low resource mode. For example, in the example given above, the second low resource mode, which requires available resource program 142 to intercept data to be transmitted to computing device 110 from the first application server and the second application server, may be associated with a higher caution factor than the first low resource mode (which only requires available resource program 142 to intercept data to be transmitted to computing device 110 from the first application server). In other embodiments, available resource program 142 may determine which low resource mode to switch to based on a prioritization placed on each resource by the user of computing device 110. If a higher prioritization is associated with a first resource when compared to a second resource, available resource program 142 may determine to switch on a low resource mode that corresponds to the first resource. In further embodiments, a specific low resource mode may be associated with having two or more resources whose amounts are below the threshold level. For example, a first amount of the first resource may correspond to a first low resource mode, while a second amount of the second resource may correspond to a second low resource mode. However, a computing device having a first amount of the first resource and a second amount of the second resource may correspond to a third low resource mode.

In the example embodiment, available resource program 142 determines if the amount of the available resource meet or exceeds the respective threshold level(s) (decision 208). In the example embodiment, available resource program 142 determines, at a second time period that is later than the first time period, if the amount of the available resource meet or exceeds the respective threshold level(s). For example, if at decision 202 (first time period), available resource program 142 determined that the battery life for computing device 110 was below the corresponding threshold level, available resource program 142 may determine if the battery life meets or exceeds the threshold level at the second time period. If available resource program 142 determines that the amount of the available resource does not meet or exceed the respective threshold level (decision 208, "NO" branch), available resource program 142 continues monitoring computing device 110, and further may check in again to determine if, at a third time period, whether the amount of the available resource meets or exceeds the respective threshold level (step 210).

If available resource program 142 determines that the amount of the available resource does meet or exceed the respective threshold level (decision 208, "YES" branch), available resource program 142 switches computing device 110 back to the normal operating mode (step 212). In the example embodiment, the normal operating mode is the mode at which the device was running prior to being switched into the determined low resource mode. For example, available resource program 142 may not intercept or may halt the interception of data intended for computing device 110 when computing device 110 is in normal operating mode. In addition, in the example embodiment, switching computing device 110 back to normal operating mode may include available resource program 142 transmitting/releasing the intercepted (and cached) data (or at least a portion of the released data) to computing device 110. The transmitting/releasing of the intercepted data is described in further detail below.

In addition, as stated above, in the example embodiment, switching computing device 110 back to the normal operating mode may be done without performing an action on computing device 110, but rather by toggling an indicator maintained in a database, the indicator corresponding to computing device 110. In other embodiments, available resource program 142 may transmit a notification to computing device 110 that low resource mode is being toggled off.

Furthermore, in the example embodiment, switching back to the normal operating mode does not affect any settings or actions that do not correspond to the switching of computing device 110 to the determined low resource mode. For example, if while in the determined low resource mode, a first setting was changed by the user of computing device 110 (and the first setting being changed was not related to the toggling on of the determined low resource mode), available resource program 142, when switching computing device 110 back to the normal operating mode, would not alter the current state of the first setting. In other embodiments, when switching computing device 110 back to the normal operating mode, available resource program 142 may switch back any settings that were changed or adjusted while computing device 110 was in the determined low resources mode.

As stated above, in other embodiments, available resource program 142 may monitor multiple resources on computing device 110, and therefore, available resource program 142 may determine if all of the multiple resources that were detected at below their respective threshold levels at the first time period, meets or exceeds their respective threshold levels at the second time period. For example, if an amount of a first resource and an amount of a second resource are below their respective threshold level at the first time period, and available resource program 142 determines that, at the second time period, the amount of the first resource and the amount of the second resource meets or exceeds their respective threshold level, available resource program 142 may switch computing device 110 back to normal operating mode in the manner described above. Alternatively, if available resource program 142 determines that the amount of the first resource meets or exceeds the corresponding threshold level, but the amount of the second resource is below the corresponding threshold level, available resource program 142 may switch to a different low resource mode that corresponds to the amount of the second resource. Furthermore, if an amount of a first resource and a second resource are below their respective threshold level at the first time period, and available resource program 142 determines that, at the second time period, the amount of the first resource meets or exceeds their respective threshold level, but the amount of the second resource is below the corresponding threshold level and an amount of a third resource is below the respective threshold level, available resource program 142 may switch to a different low resource mode that corresponds to the amount of the second resource and the amount of the third resource.

As stated above, in the example embodiment, available resource program 142 may release the intercepted data to computing device 110 based on available resource program 142 switching computing device 110 into normal operating mode. In the example embodiment, the entirety of the intercepted data may be transmitted/released to computing device 110 (when computing device 110 is switched to normal operating mode), however in other embodiments, the intercepted data may be transmitted/released to computing device 110 in a piecemeal fashion. For example, a certain amount of data is transmitted every 10 minutes, or alternatively, a certain amount of data is transmitted upon computing device 110 reaching certain levels of an available amount of a resource (a first portion of data may be transmitted upon reaching 10% battery life, a second portion of data may be transmitted upon reaching 20%, etc.).

In other embodiments, along with intercepting data and caching the data in data cache 144 as described above, switching to a determined low resource mode may additionally include available resource program 142 releasing (or transmitting) the intercepted data (or a portion of the intercepted data) to computing device 110 based on the determined low resource mode. For example, a determined low resource mode may call for the intercepted data (or a portion of the intercepted data) to be released to computing device 110 after a certain time period has been reached. For example, available resource program 142 may release a portion of the intercepted data 10 min after caching, and another portion 30 min after caching, and release all remaining intercepted data 2 hours after caching. Alternatively, available resource program 142 may release all intercepted data after a single time period has passed, such as, transmitting/releasing all intercepted data 2 hours after caching.

In another example, a determined low resource mode may call for the intercepted data to be released based on the amount of the available resource. For example, with regard to battery life, available resource program 142 may release a portion of the intercepted data when the battery life of computing device 110 has reached 10%, and further release an additional portion when the battery life of computing device 110 has reached 15%, and finally release any leftover portion of the intercepted data once the battery life has reached 20%. Alternatively, as stated above, available resource program 142 may release all intercepted data after an amount of available resource has met or exceeded the respective threshold level (and the computing device has been switched back to the normal operating mode), such as transmitting/releasing all intercepted data after the battery life has reached 20%.

In an additional example, a determined low resource mode may call for the intercepted data to be released based on a storage limit being reached in data cache 144. For example, if available resource program 142 intercepts data (and caches the intercepted data in data cache 144), based on computing device 110 being switched to a determined low resource mode, and the amount of intercepted data in data cache 144 reaches a certain storage limit, available resource program 142 may begin transmitting/releasing a portion of the intercepted data to avoid the storage limit from being breached. In the example embodiment, the release of the data may conform to a "first in, first out" rule, so that the data that was intercepted first is released first, however, in other embodiments, the release of the data may be based on a priority of the data, a priority of an application the data corresponds to, or alternatively, available resource program 142 may halt interception of data intended for computing device 110 upon reaching the storage limit. Furthermore, the release of the data may be based on a classification of the intercepted data. For example, certain file types may have a higher priority based on the file type, based on the size of the file, or based on the application the file corresponds to. For example, available resource program 142 may release the intercepted data that is associated with a high priority prior to the data that is associated with a lower priority.

Furthermore, in some embodiments, the user of computing device 110 may be automatically charged based on the storage limit or a storage time being exceeded, with the charge corresponding to the amount that the storage limit is exceeded by or the amount of time the storage limit is exceeded by. Additionally, in other embodiments, the specific data release protocol may be associated with the user or the specific computing device (such as computing device 110) rather than being associated with the determined low resource mode.

Furthermore, in additional embodiments, as stated above, available resource program 142 may transmit references to the cached data, such as an identifier, to computing device 110. The references may be utilized by computing device 110 to pull data from server 140. In the additional embodiments, computing device 110 may utilize the methodologies described above when pulling the data. For example, computing device 110 may pull a certain amount of data based on each level of battery life that is achieved by computing device 110.

Figure 3:
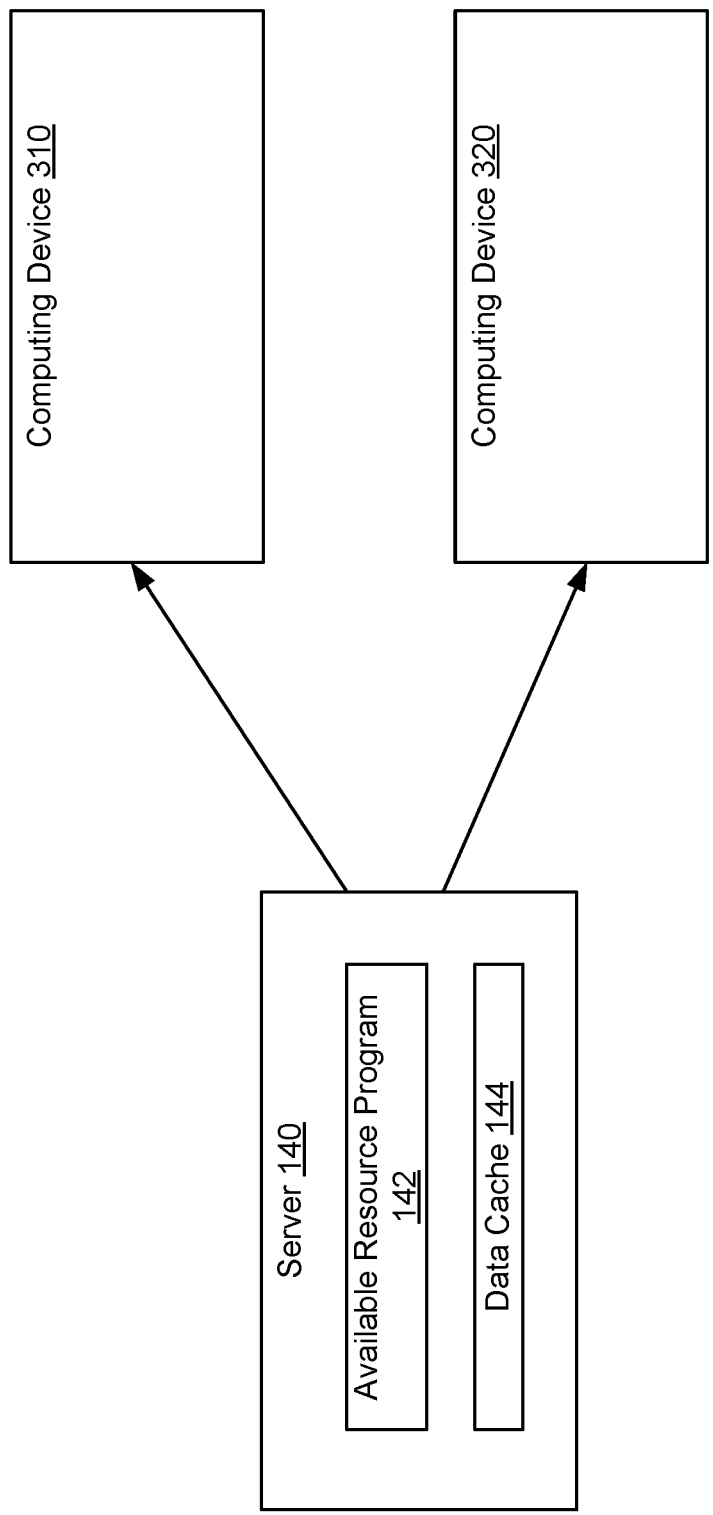
FIG. 3 depicts a data flow to one or more alternative devices, in accordance with an embodiment.

FIG. 3 is data flow diagram that depicts a data flow from server 140 to one or more alternative devices (computing device 310 and computing device 320). In the example embodiment, the low resource mode described above may include available resource program 142 determining if computing device 110 is associated with one or more alternative devices. For example, the user of computing device 110 may additionally specify one or more alternate devices, such as a smart watch and a tablet. In alternate embodiments, available resource program 142 may identify the one or more alternate devices based on the usage of certain applications on multiple devices. For example, if the user of computing device 110 utilizes (and logs in to) application 112 on computing device 110, computing device 310, and computing device 320 (and further if the devices are listed as trusted devices with regard to application 112), available resource program 142 may determine that computing device 310 and computing device 320 are alternate devices for computing device 110. As stated above, the low resource mode described above may include available resource program 142 determining if computing device 110 is associated with one or more alternative devices. Further, available resource program 142 may communicate with each alternative device to identify the specifications and capabilities of each device. Based on the determined specifications and capabilities of each device, after switching computing device 110 into the determined low resource mode, available resource program 142 may determine whether to transmit all or part of the intercepted data to one or both of the alternative devices. For example, available resource program 142 may determine that computing device 310 is a smart watch that has the capabilities to receive and display text messages, but does not have the capabilities to display high-resolution video. Therefore, if available resource program 142 intercepts data, in accordance with the determined low resource mode, that includes both text messages and a high-resolution video, available resource program 142 may transmit the text messages to computing device 310, while maintaining the high-resolution video in cache (until available resource program determines to release the data to computing device 110 in accordance with the determined low resource mode). In this example, due to the intercepted data corresponding to the text messages being transmitted to an alternate device, the intercepted data corresponding to the text messages may not be released to computing device 110 (for example, upon switching computing device 110 back to the normal operating mode), however, in other embodiments, the intercepted data corresponding to the text messages may be released to computing device 110 as described with regard to FIG. 2 (as well as being transmitted to the alternative device, computing device 310).

In addition, to determining capabilities and specifications of each alternative device, available resource program 142 may determine the amount of available resources on each alternative device as well, as described above. For example, if available resource program 142 determines that computing device 310 has a battery life that is below a threshold level (the threshold level determined as described above), available resource program 142 may determine not to transmit a certain portion of the intercepted data to computing device 310 (for example, may transmit only text messages and not a high resolution video). Alternatively, based on the amount of available resources determined for an alternative device, available resource program 142 may transmit an additional amount of intercepted data to another alternative device.

Furthermore, if more than one alternative device is associated with computing device 110, available resource program 142 may determine which alternative device to transmit the intercepted data to based on a prioritization of the alternative devices. The prioritization may be input by the user of computing device 110, or alternatively may be determined by available resource program 142 based on the frequency of usage of each of the alternative devices (if available resource program 142 determines that an alternative device is utilized more frequently, a higher prioritization may be assigned to the device), or based on the frequency of usage of each of the alternative devices with regard to specific applications. For example, if available resource program 142 intercepts data intended to be transmitted to computing device 110, with the intercepted data corresponding to a first application, available resource program 142 may determine that, when comparing alternative devices computing device 310 and computing device 320, the user of computing device 110 utilizes computing device 310 to use the first application more than the user of computing device 110 utilizes computing device 320 to use the first application. In this example, available resource may assign a higher priority to computing device 310 with regard to intercepted data corresponding to the first application, however, may assign a higher priority to computing device 320 with regard to intercepted data corresponding to other applications (based on performing an analysis as described above).

In additional embodiments, the intercepted data may be released/transmitted to the alternative devices in accordance to the embodiments described in FIG. 2. For example, available resource program 142 may first cache the intercepted data in data cached 144, and then release the intercepted data to the appropriate alternate devices based on a storage limit being reached. For example, if available resource program 142 intercepts data, based on computing device 110 being switched to a determined low resource mode, and the amount of intercepted data in data cache 144 reaches a certain storage limit, available resource program 142 may begin transmitting/releasing a portion of the intercepted data to avoid the storage limit from being breached, as described above with regard to FIG. 2. Furthermore, in other embodiments, available resource program 142 may release the intercepted data (from data cache 144) to one or more appropriate alternate devices after a certain time period has been reached. For example, available resource program 142 may release a portion of the intercepted data 10 min after caching, and another portion 30 min after caching, and release all remaining intercepted data 2 hours after caching. Alternatively, available resource program 142 may release all intercepted data after a single time period has passed, such as, transmitting/releasing all intercepted data 2 hours after caching, as described above.

Figure 4:
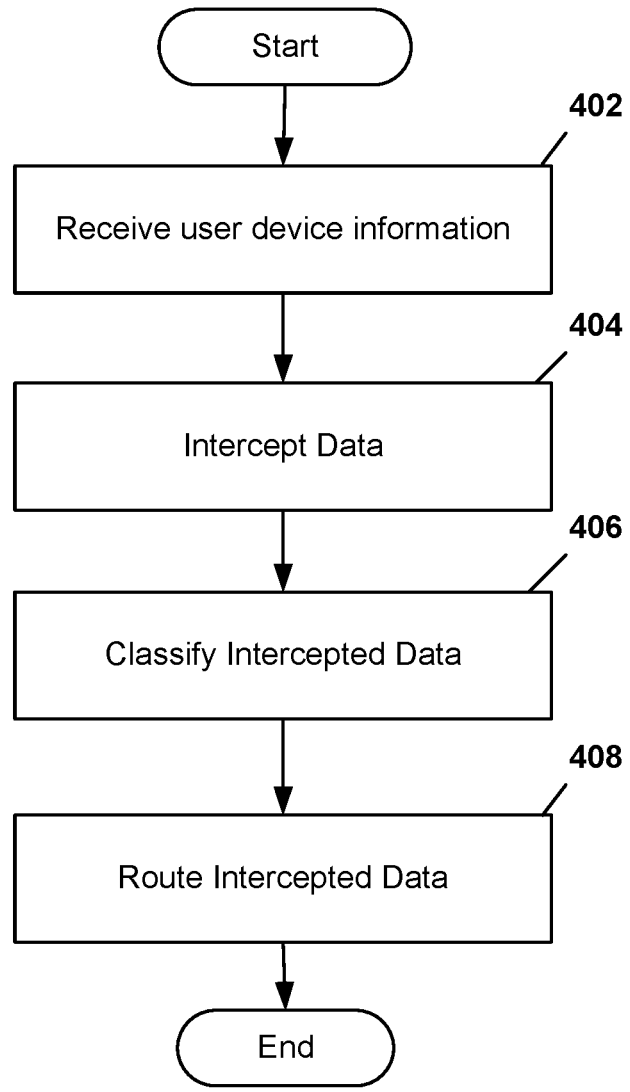
FIG. 4 is a flowchart illustrating the operations of the available resource program of FIG. 1 in routing data to one or more alternative devices, in accordance with an embodiment.

FIG. 4 is a flowchart illustrating the operations of available resource program 142 in routing data to one or more alternative devices, in accordance with an embodiment. In the example embodiment, available resource program 142 receives user device information for each alternative device (step 402). In the example embodiment, the alternative devices may be identified by way of user input, as discussed above, or may be determined by available resource program 142 as discussed above. Furthermore, as discussed above, the user device information may include device capability information (such as file types that are supported) and device specifications (such as storage capacity, etc.).

Available resource program 142 intercepts data from one or more application servers, as discussed above, in response to being switched into a determined low resource mode (step 404). Available resource program 142 may classify the intercepted data based on the type of data and device requirements associated with the data (step 406). For example, a high-resolution video may be associated with a different classification than a text message or a social media message. In other embodiments, a high-resolution video may have a different classification than a low-resolution video. In further embodiments, different file types may additionally have different classifications, for example, a ".mkv" file may have a different classification from a "mpeg" file.

In the example embodiment, available resource program 142 routes the intercepted data to an alternate device based on the user device information and the classification of the data (step 408). For example, as stated above, available resource program 142 may determine that an alternative computing device, such as computing device 310, has capability to handle certain file types, and therefore, available resource program 142 may transmit a portion of the intercepted data that corresponds to the certain file types to computing device 310. In another example, as stated above, available resource program 142 may consider a storage capacity on an alternate computing device, and transmit a portion or all of the intercepted data based on the determined storage capacity of the alternate device. Furthermore, in the example embodiment, as stated above, the routing of the intercepted data to the alternate device or devices occurs while computing device 110 is in the determined low resource mode.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
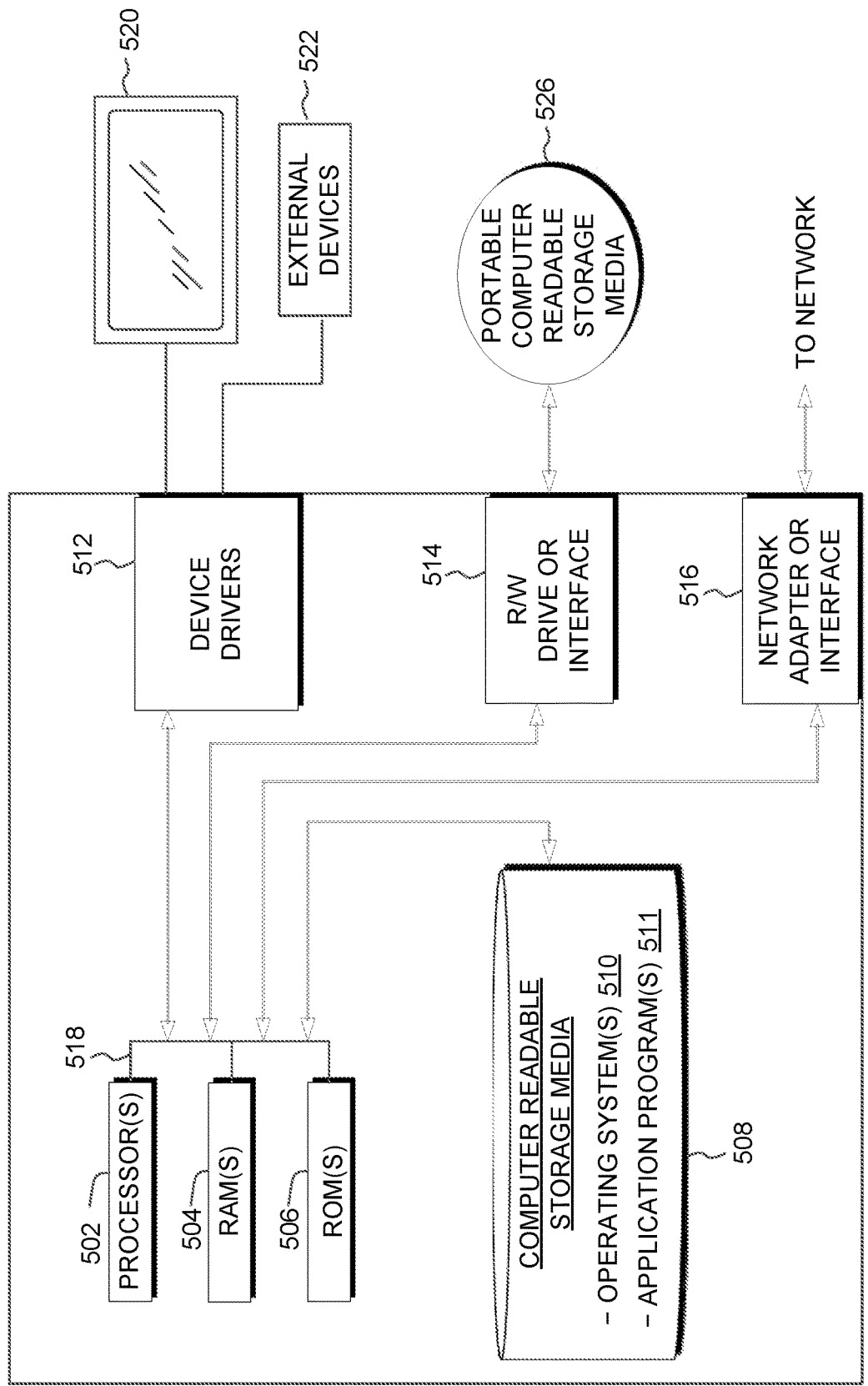
FIG. 5 is a block diagram depicting the hardware components of the available resource system of FIG. 1, and the alternative devices of FIG. 3, in accordance with an embodiment.

FIG. 5 depicts a block diagram of components of computing devices contained in available resource system 100 of FIG. 1, and computing device 310 and computing device 320 of FIG. 3, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, available resource program 142, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
 a non-transitory memory; and
 one or more hardware processors communicatively coupled to the non-transitory memory and configured to read instructions from the non-transitory memory to cause the system to perform operations comprising:
  detecting, at a first time instance, that an available amount of a first resource on a computing device is below a first threshold level;
  in response to the detecting, switching to operate in a first operating mode, wherein operating in the first operating mode comprises (i) intercepting first data intended to be transmitted to the computing device and (ii) transmitting at least a first portion of the intercepted first data to the computing device in response to determining that a size of the intercepted first data exceeds a storage limit;
  detecting, at a second time instance subsequent to the first time instance, that the available amount of the first resource on the computing device meets or exceeds the first threshold level; and
  in response to detecting that the available amount of the first resource meets or exceeds the first threshold level, switching to operate in a second operating mode, wherein operating in the second operating mode comprises halting the intercepting of the first data intended to be transmitted to the computing device.

2. The system of claim 1, wherein the switching to operate in the second operating mode further comprises transmitting a second portion of the intercepted first data to the computing device.

3. The system of claim 1, wherein the switching to operate the first operating mode further comprises transmitting a second portion of the intercepted first data to the computing device in response to determining that the intercepted first data has been stored in a data cache for an amount of time exceeding a threshold amount of time.

4. The system of claim 1, wherein the first data corresponds to a first set of one or more applications installed on the computing device, and wherein the operations further comprise:
 detecting that an available amount of a second resource on the computing device is below a second threshold level; and
 in response to the detecting, switching to operate in a third operating mode, wherein the operating in the third operating mode comprises intercepting second data intended to be transmitted to the computing device, wherein the second data corresponds to a second set of the one or more applications installed on the computing device.

5. The system of claim 4, wherein the switching to operate in the second operating mode is further responsive to detecting, at the second time instance, that the available amount of the second resource on the computing device meets or exceeds the second threshold level.

6. The system of claim 1, wherein the operations further comprise:
 assigning a first classification to the first portion of the intercepted first data; and
 assigning a second classification to a second portion of the intercepted first data.

7. The system of claim 6, wherein the operating in the first operating mode further comprises transmitting the first portion of the intercepted first data to the computing device prior to transmitting the second portion of the intercepted first data to the computing device based on the first and second classifications.

8. The system of claim 1, wherein operating in the first operating mode further comprises:
 identifying one or more alternate computing devices associated with the computing device; and
 transmitting at least the first portion of the intercepted first data to a first one of the identified one or more alternate computing devices.

9. A method, comprising:
 detecting, by one or more hardware processors at a first time instance, that an available amount of a first resource on a computing device is below a first threshold level;
 in response to the detecting, switching, by the one or more hardware processors, to operate in a first operating mode, wherein operating in the first operating mode comprises intercepting data intended to be transmitted to the computing device;

assigning, by the one or more hardware processors, a first classification to a first portion of the intercepted data and a second classification to a second portion of the intercepted data;

detecting, by the one or more hardware processors at a second time instance subsequent to the first time instance, that the available amount of the first resource on the computing device meets or exceeds the first threshold level; and in response to detecting that the available amount of the first resource meets or exceeds the first threshold level, switching, by the one or more hardware processors, to operate in a second operating mode, wherein operating in the second operating mode comprises transmitting the intercepted data to the computing device, wherein the transmitting comprises transmitting the first portion of the intercepted data to the computing device before transmitting the second portion of the intercepted data to the computing device based on the first and second classifications.

10. The method of claim 9, wherein operating in the second operating mode further comprises halting the intercepting of the data intended to be transmitted to the computing device.

11. The method of claim 9, wherein operating in the first operating mode further comprises transmitting a third portion of the intercepted data to the computing device in response to determining that the intercepted data exceeding a storage limit.

12. The method of claim 9, wherein operating in the first operating mode further comprises:
storing the intercepted data outside the computing device; and
in response to determining that the intercepted data has been stored outside the computing device for a duration exceeding a threshold amount of time, transmitting a third portion of the intercepted data to the computing device.

13. The method of claim 9, wherein operating in the first operating mode further comprises identifying one or more alternate computing devices associated with the computing device.

14. The method of claim 13, wherein operating in the first operating mode further comprises transmitting at least the first portion of the intercepted data to a first alternate computing device of the one or more alternate computing devices based on a device capability of the first alternate computing device.

15. A non-transitory machine-readable medium having stored thereon machine-readable instructions executable to cause a machine to perform operations comprising:
detecting that an available amount of a first resource on a computing device is below a first threshold level;
in response to the detecting, switching to operate in a first operating mode, wherein operating in the first operating mode comprises intercepting first data intended to be transmitted to the computing device, wherein the first data corresponds to a first set of one or more applications installed on the computing device;
detecting that an available amount of a second resource is below a second threshold level;
in response to detecting that the available amount of the second resource is below the second threshold level, switching to operate in a second operating mode, wherein operating in the second operating mode comprises intercepting second data intended to be transmitted to the computing device, wherein the second data corresponds to a second set of the one or more applications installed on the computing device;
detecting that the available amount of the first resource on the computing device meets or exceeds the first threshold level; and
in response to detecting that the available amount of the first resource meets or exceeds the first threshold level, switching to operate in a third operating mode, wherein operating in the third operating mode includes halting the intercepting of the first data intended to be transmitted to the computing device.

16. The non-transitory machine-readable medium of claim 15, wherein the operations further comprise:
detecting that the available amount of the second resource on the computing device meets or exceeds the second threshold level; and
in response to detecting that the available amount of the second resource meets or exceeds the second threshold level, switching to operate in a fourth operating mode, wherein the operating in the fourth operating mode comprises halting the intercepting of the second data intended to be transmitted to the computing device.

17. The non-transitory machine-readable medium of claim 15, wherein operating in the third operating mode comprises transmitting the intercepted first data to the computing device.

18. The non-transitory machine-readable medium of claim 15, wherein operating in the first operating mode further comprises transmitting a first portion of the intercepted first data to the computing device in response to determining that the intercepted first data has been stored for an amount of time exceeding a threshold amount of time.

19. The non-transitory machine-readable medium of claim 15, wherein operating in the first operating mode further comprises transmitting a first portion of the intercepted first data to the computing device in response to determining that a size of the intercepted first data exceeds a storage limit.

20. The non-transitory machine-readable medium of claim 15, wherein operating in the first operating mode further comprises:
identifying one or more alternate computing devices associated with the computing device; and
transmitting at least a first portion of the intercepted first data to a first one of the identified one or more alternate computing devices.

* * * * *